UNITED STATES PATENT OFFICE.

ACHILLE CHAUMAT, OF FRESNOY-LE-GRAND, FRANCE, ASSIGNOR TO COMPAGNIE FRANCAISE DES APPLICATIONS DE LA CELLULOSE, OF PARIS, FRANCE, A CORPORATION OF FRANCE.

MANUFACTURE OF CELLULOSE PRODUCTS.

1,027,689.      Specification of Letters Patent.      Patented May 28, 1912.

No Drawing.      Application filed June 26, 1911. Serial No. 635,334.

*To all whom it may concern:*

Be it known that I, ACHILLE CHAUMAT, citizen of the French Republic, residing at Fresnoy-le-Grand, Department of the Aisne, France, have invented certain new and useful Improvements in and Relating to the Manufacture of Cellulosic Products; and I do hereby declare the following to be a full, clear, and exact description of the invention, such as will enable others skilled in the art to which it appertains to make and use the same.

The invention has for its object a novel coagulation process rendering it possible to manufacture cellulose products from solutions of cellulose in ammoniacal cupric oxid. This process is based upon the property presented by certain soluble arsenites or arsenious acid of furnishing coagulation products charged with all the copper contained in the solvent of the cellulose, which presents notable advantages as compared with the known processes.

The two principal coagulation processes employed in the industrial applications of solutions of cellulose in ammoniacal cupric oxid are based upon the action of acid solutions and upon the action of caustic alkaline lyes.

The characteristic of the coagulation of solutions of cellulose in the acids is that products constituted by cellulose or hydrocellulose are obtained directly all the copper and all the ammonia of the solution of cellulose passing integrally into the coagulant in order to form the salts of copper and of ammonia corresponding to the acid employed.

In the case of coagulation by caustic alkaline lyes, on the contrary, the cellulose is not precipitated in the state of cellulose but in combination with copper. It does not follow from this that all the copper of the solution of cellulose is found in the coagulum; on the contrary, a portion of the copper and also a portion of the ammonia contained in the solution of cellulose pass into the coagulant which assumes a blue color as soon as contact between it and the solution of cellulose takes place.

The cupriferous products obtained by coagulation by means of the alkaline lyes therefore contain only a portion of the copper which was contained in the solution of cellulose.

It has been found that the arsenites or arsenious acid possess a certain coagulant power and that they present this curious property of causing the whole of the copper contained in the ammoniacal solution of oxid to pass into the coagulum leaving the coagulation bath limpid. It was difficult to foresee this result and there was reason to think that a portion of the copper would pass into the coagulant as in the case of the ordinary coagulation by the alkaline lyes, but that this copper by reason of the highly reducing properties of the arsenious acid would be reduced to the state of red cuprous oxid.

It should be noted that the products obtained by the coagulation of the solution of cellulose through baths formed solely of arsenite or of arsenious acid would not be of good quality. The best results are obtained when a certain proportion of a soluble arsenite is added to caustic alkaline lyes, preferably an alkaline arsenite or, what comes to the same thing, arsenious acid. The coagulation then furnishes cupriferous products containing all the copper of the solution of cellulose and capable of being dried after washing so as to eliminate the alkali and the ammonia. The importance of the addition of the arsenites to the coagulation lyes resides in the fact that the cellulosic products obtained, after these cupriferous compounds have been freed from copper by means of an acid, are distinguished by great pliability and by very remarkable elasticity. The technical advantages of the novel coagulation bath do not stop there. As no trace of copper passes into the coagulation bath and as even after prolonged use not the smallest precipitate is noticeable in this bath, it remains clear indefinitely and suitable for coagulation without the necessity for regenerating it by any chemical or physical treatment. Its coagulant power therefore remains constant.

Owing to the absence of precipitate and of coloration in the bath, the operation of the coagulation of the cellulose products is rendered very easy to supervise which is highly important not only in the case of thread for insuring smoothness in the progress of the spinning but more particularly in the case of the manufacture of artificial fabrics on an engraved cylinder in which case with colored or cloudy coagulation baths it is not possible to obviate accidents in the operation, mainly the adherence of the fabric to the engraved roller because they are not observed in time. Great simplification is also effected in the recuperation of the copper employed which in this case is obtained in a unique form by treating the acid baths coming from the decuperation of the cupriferous products.

The following is given as an example of a method of carrying this process into practice: A solution of cellulose in ammoniacal cupric oxid containing six per cent. of cellulose and 6 to 7 per cent. of ammonia is pressed through dies of fine aperture into a coagulant bath formed of soda lye at 30% for example and to which 10 gm. per liter of commercial white arsenious acid are added; this dissolves therein very readily. There is nothing fixed about these proportions which are given only as those furnishing good results. The coagulation bath being heated to 60 to 65° it is found that even at the end of a month's continuous operation the bath remains perfectly limpid, colorless and free from any cupric precipitate. The effect of the arsenite is absolute and at the end of this period even with the most sensitive re-agents it is impossible to discover any trace of copper in the coagulant bath.

The coagulated cupriferous thread is wound on spools for example. In this state it differs as regards appearance from thread coagulated in alkali alone by its somewhat more pronounced and intense blue color. When washed in water in order to eliminate the alkali in excess it readily becomes decuprated in dilute sulfuric acid at 5° Baumé without giving rise to any precipitation of cupro-arsenic products, in furnishing a waterproof thread which is perfectly transparent. When this thread is dried and stretched it is distinguished by great brilliancy, remarkable pliability and elasticity exceeding 20%.

The same properties are found in all the various cellulose products obtained by this process such as threads, films, artificial fabrics, plastic masses, and so forth.

I claim:

1. The process for obtaining coagulated cellulose products, consisting in passing a solution of cellulose and ammoniacal copper oxid through a bath containing arsenic as an element thereby causing all the copper of the said cellulose and ammoniacal copper oxid solution to pass into the coagulated products.

2. The process for obtaining coagulated cellulose, consisting in passing a solution of cellulose and ammoniacal copper oxid through a bath containing arsenious acid thereby causing all the copper of the said solution to pass in the coagulated products, to allow the said bath to remain clear.

3. The process for obtaining coagulated cellulose products consisting in passing a solution of cellulose and ammoniacal copper oxid through a bath containing arsenic as an element thereby causing all the copper of the said solution to pass into the coagulated products and then treating said products with sulfuric acid to decuperate the same.

In testimony whereof I affix my signature, in presence of two witnesses.

ACHILLE CHAUMAT.

Witnesses:
  H. C. COXE,
  EMILE KLOTZ.